2,370,190

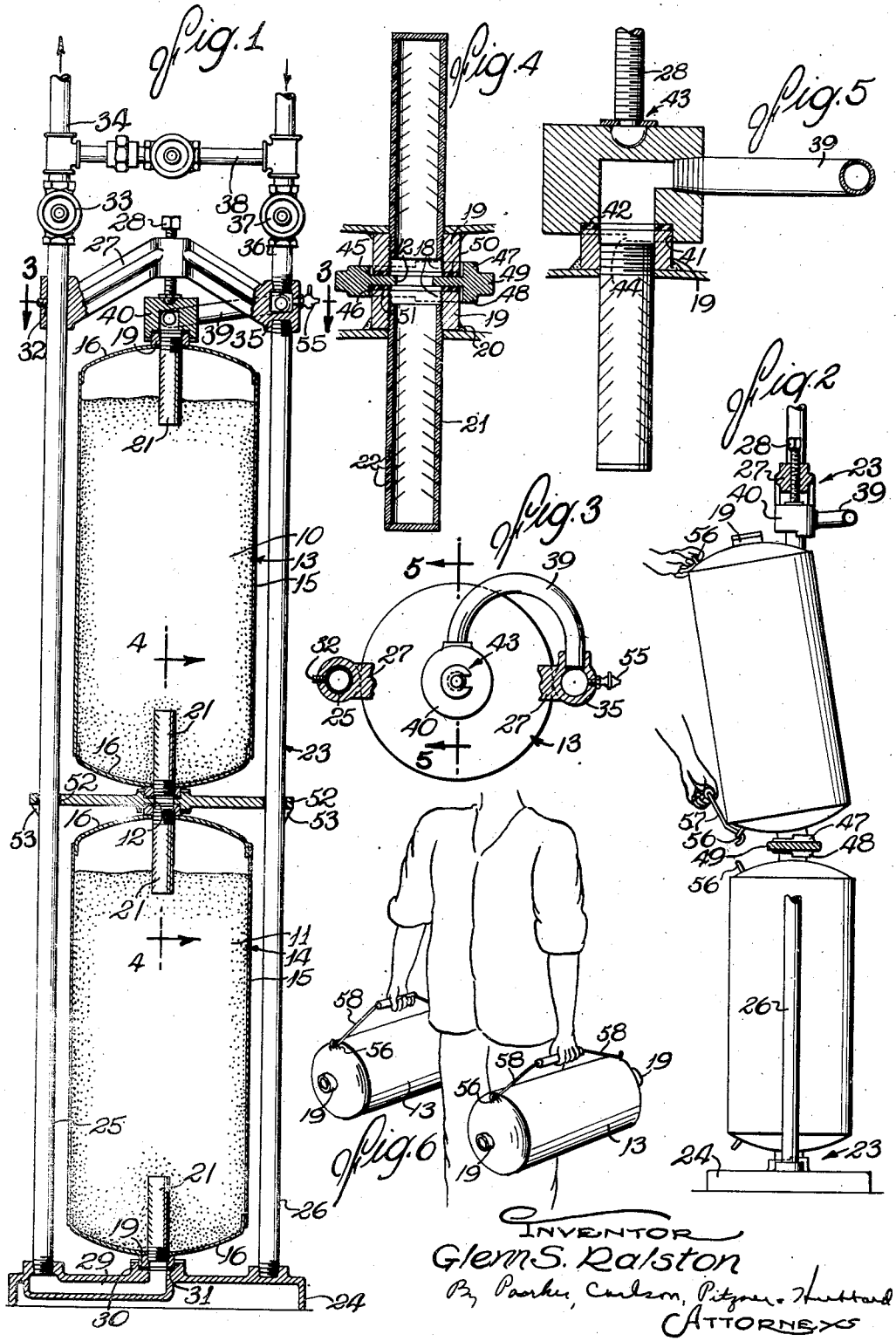
Feb. 27, 1945.    G. S. RALSTON    2,370,190
WATER SOFTENER
Filed Aug. 21, 1941
INVENTOR
Glenn S. Ralston
By Parker, Carlson, Pitzner-Hubbard
ATTORNEYS Patented Feb. 27, 1945

UNITED STATES PATENT OFFICE 2,370,190

WATER SOFTENER

Glenn S. Ralston, Rockford, Ill., assignor to Servisoft, Inc., Rockford, Ill., a corporation of Illinois Application August 21, 1941, Serial No. 407,700

9 Claims. (Cl. 210—24)

This invention relates generally to water softeners utilizing base exchange mineral.

One object is to arrange the mineral body in a novel manner to provide for its more efficient utilization.

A more detailed object is to distribute the mineral body in a plurality of compartments interconnected by a passage of smaller cross-sectional area than the area of either body.

Another object is to provide a softener of the above character having its mineral tank mounted in a novel manner for quick detachment from and replacement in a supporting frame.

The invention also resides in the novel construction of the softener frame which facilitates quick detachment, which enables the water pressure applied internally of the tank to produce a tight water seal, and which itself constitutes a part of the water passage between the softener inlet and outlet.

Other objects and advantages of the invention will become apparent from the following detailed description taken in connection with the accompanying drawing, in which Figure 1 is a vertical central sectional view of the improved softener.

Fig. 2 is a side elevation with certain of the parts broken away and shown in section.

Figs. 3 and 4 are sections taken along the lines 3—3 and 4—4 of Fig. 1.

Fig. 5 is a section taken along the line 5—5 of Fig. 3.

Fig. 6 is a perspective view illustrating the manner of carrying the tanks of the softener.

In the form shown in the drawing for purposes of illustration, the zeolite or softening mineral is divided, for reasons to appear later, into two separated bodies 10 and 11 of about forty pounds each respectively contained in two compartments connected through a passage 12 of substantially smaller area than the area of said bodies. Preferably, the compartments are defined by separate tanks 13 and 14, each comprising a cylindrical shell 15 approximately nine inches in diameter and closed at opposite ends by heads 16 welded to the shell. Each head has a central opening 18 defined in the present instance by a male fitting comprising a short cylindrical collar or flange 19 fastened as by welding 20 to the tank head around a central aperture therein. To deflect incoming water laterally of the tank and thus distribute the same over as much as possible of the upper mineral surface, a pipe 21 is threaded into the collar 19 and has a closed end portion projecting a short distance into the tank and formed with laterally extending saw slots 22. By thus making the opposite ends of the tank of the same construction, the same distributing action will be obtained irrespective of the direction of flow through the tank.

In accordance with the present invention, the tanks are mounted in series relation for the flow of water therethrough successively. Herein, one tank is disposed above the other and the two are held in a frame 23 specially constructed to minimize the piping required and to facilitate quick and easy replacement of the tanks for regeneration of the mineral at a remote point. The frame shown includes a base 24 adapted to rest on the floor and two posts 25 and 26 rigid with and upstanding from the base and spaced apart a distance somewhat greater than the diameter of the tanks. At their upper ends, the posts are connected rigidly by a crossbar 27 equipped with means, herein comprising a screw 28 for applying an endwise pressure to the tanks to clamp them in the frame and form an effective water seal between the tanks as well as between the inlet and outlet conduits and the tank ends.

In the present instance, the post 25 is made hollow and utilized as the outlet or service pipe. Its lower end is threaded into the upwardly opening end of a horizontal passage 29 in the base 24. The other passage end is defined by a narrow upstanding flange 30 loosely receiving the lower end 19 of the lower tank which end rests on a gasket 31 to form a tight seal. The tank end is thus held by the flange against lateral displacement and yet may, by slight lifting of the tank, be removed from the frame. The pipe 25 projects upwardly through one end of the crossbar to which it is fastened as by a set screw 32 and at its upper end is connected to an outlet valve 33 leading from the service line 34.

The other end of the crossbar 27 is formed with a hollow head 35 rigid with the upper end of the post 26 and has a top opening into which the hard water supply pipe 36 is threaded, this line including a valve 37 and a valve controlled by-pass 38. Connected to the side of the head 35 is a somewhat flexible, preferably curved, tube 39 extending horizontally and connected at its other end to the side of a hollow block 40. On its under side, the block is formed with a recess 41 and is thus adapted to fit over the upper flange 19 on the upper tank, a seal between the two being formed by a gasket 42 seated in the recess.

The block 40 is suspended as by a connection 43 from the lower end of the screw 28 which when tightened produces the main pressure for clamping the tanks in the frame. As the screw is loosened, the block will, by virtue of the two-way connection 43, be raised and thus lifted clear of the upper tank end 19 so as to permit this tank to be tilted forwardly as illustrated in Fig. 2. Such raising of the block is permitted by flexing of the pipe 39 and the distance the block may be raised to release the tank is reduced by cutting away the front portion of the block as indicated at 44.

In the assembled relation, the adjacent ends 19 of the two tanks are received in recesses 45 and 46 defined by flanges 47 and 48 on the upper and lower sides of a bar 49 which provides the central opening 12 above referred to. Gaskets 50 and 51 around this opening abut against the ends of the tanks. The posts 25 and 26 project loosely through holes 52 in opposite ends of the bar and center the opening 12 relative to the tanks and the recess 41 and the flange 30 while at the same time permitting the bar to be lifted clear of the upper end of the lower tank preparatory to removing the latter. When the bar is resting on lugs 53 on the posts, the flanges 47 and 48 are properly positioned to receive the adjacent tank ends 19 and to form a gasket sealed joint between the two under the pressure applied by the clamp 28.

Owing to the small area of the tank openings as compared to the total cross-section of the tank, the total water pressure applied at the tank ends will be comparatively small and may be resisted by a correspondingly small clamping force. Actually, a substantial portion of this force is derived in the present instance from the water pressure itself. This pressure acting on the tank heads 16 expands the tank slightly in an endwise direction and this expansion is resisted by the rigidly connected base 24 and the bar 27 with the result that the sealing pressure is increased correspondingly. So effective is this action that, in practice, it has been found unnecessary to employ a wrench in tightening the screw 28 after assembly of the tanks, it being sufficient simply to turn down the screw only until the gasket 42 is seated lightly against the upper tank end. Then, when the water pressure is applied, the tanks will be elongated enough to create the necessary sealing pressure. In this way, breaking of the upper tank connection preparatory to removing the tanks is greatly facilitated.

With the construction above described, the tanks may be removed quickly and conveniently and replaced by other similar tanks containing regenerated mineral. Preparatory to this, the valves 33 and 37 are closed and a valve 55 opened to relieve the internal pressure. The screw 28 may then be loosened by hand to raise the block 40 above the upper tank end 19, whereupon the upper tank 13 may be tipped forwardly as shown in Fig. 2 while this tank is still supported at its lower end on the gasket 50. A suitable hook 51 usually is inserted in an eye 56 on one tank head while a similar eye on the other head is gripped by hand.

After tipping the tank forwardly, it is lifted clear of the flange 47 and removed from the frame. Then, the bar 49 is raised sufficiently to free the upper end of the lower tank which is tipped forwardly and then lifted out of the recess in the base. Straps 58, of which the hook 57 may form a part, may be attached at opposite ends to the eyes 56 and thus utilized in carrying the tanks of mineral to and from the softener installation as illustrated in Fig. 6. Such carrying of the mineral and its container is facilitated by the division of the mineral into two bodies of convenient weight and the enclosure of these bodies in tanks which may be held easily and balanced while being carried.

The reverse procedure is followed in assembling new tanks in the frame. One tank is placed, either end up, on the base with its end telescoping with the flange 30 and tipped into alinement with the flange 48 after which the bar 49 is lowered, the tank thus becoming held against tipping. One end of the upper tank is next inserted in the flange 47 and the tank 13 tipped into alinement with the recess 41 after which the block 41 is lowered by turning the screw 28 until the gasket 42 comes lightly against the upper tank end. By opening the valves 33 and 37, the softener is again conditioned for use, the hard water flowing through the pipe 36, then successively down through the upper and lower tanks, and finally up through the pipe 25 into the service line.

With the tanks thus assembled, there is no possibility of the seals being broken by displacement of the tanks. This is because the remote ends are held rigidly against lateral displacement by the crossbar 27 and the base 24 and displacement of the adjacent ends is prevented by the bar 49 when in its lowered position.

It will be observed that by making the opposite tank ends 19 of the same construction, the tanks are reversible and may be mounted in the frame either end up. This is advantageous not only to facilitate assembly and reduce manufacturing costs but also to prevent channeling or caking of the mineral. Thus, as an incident to use of each tank in different softener installations and during washing of the mineral after regeneration, the water will naturally be caused to flow through the mineral in different directions.

With the body of mineral for each softener installation divided into two parts as above described and separated by the passage 12 substantially smaller in area than the cross-section, it has been found that the total softening capacity of a given amount of zeolite is increased considerably. That is to say, a greater volume of water may be softened than with the same amount of mineral in a single body of the same diameter. The causes of this substantial increase in efficiency have not been established conclusively. One apparent cause is the fact that during service use of a down flow zeolite softener, the water tends, particularly during high flow rates, to take a definite path comprising a cone whose base is defined by the top of the mineral body over which the incoming water is distributed and whose apex is the water outlet. Thus, although the tank remains full, the water actually bypasses a substantial portion of the mineral around the outer edge portions of the body, that is, outside of the cone above described. The amount of mineral thus by-passed and not utilized efficiently is increased in proportion to the length of the tank. By dividing up the mineral body into several parts and redistributing the water as it enters the successive parts, it will be apparent that the volume of mineral by-passed is correspondingly decreased.

I claim as my invention:

1. A water softener having, in combination, a base providing a water passage terminating in an upwardly facing opening surrounded by a gasket abutment, a tank having upper and lower end openings surrounded by gasket abutments, the abutment at said lower end opening engaging said first mentioned abutment, a frame upstanding from said base, means on said frame providing a water passage, a conduit permanently connected to the last mentioned passage and mounted on said frame for movement of its free end into and out of engagement with the abutment at said upper end opening, and means on said frame manually operable to derive a downwardly directed pressure and apply the same to the free end of said conduit to clamp the tank between the conduit and said base, said passages constituting a hard water inlet and a soft water outlet.

2. A water softener having, in combination, a base providing a water passage terminating in an upwardly facing opening surrounded by a gasket abutment, a tank having upper and lower end openings surrounded by gasket abutments, the abutment at said lower end opening engaging said first mentioned abutment, a frame upstanding from said base, means on said frame providing a water passage, a conduit permanently connected to the last mentioned passage and mounted on said frame with its free end projecting laterally above said tank and movable vertically, a fitting on the free end of said conduit adapted to engage the abutment at said upper end opening, and means acting between said frame and said fitting to separate the two and clamp the tank between said fitting and said base, said passages constituting a hard water inlet and a soft water outlet.

3. A water softener having, in combination, two similar tanks arranged one above the other in end to end relation and each having fittings of the same size and shape projecting from their ends and defining alined openings, a frame supporting said tanks and engaging the fittings at the upper end of the upper tank and the lower end of the lower tank, said frame providing water passages communicating with the latter tank ends, one constituting a hard water inlet and the other a soft water outlet, and a member telescoping with the similarly sized fittings at the adjacent ends of said tanks and having detachable gasket sealed connections with the two tanks, said member engaging said frame to hold the parts of said connections against relative lateral displacement and providing a water passage between the tanks.

4. A water softener having, in combination, a base providing a laterally extending water passage terminating in spaced openings one of which faces upwardly, two posts upstanding from said base one being hollow and communicating at its lower end with the other of said base openings, a tank containing water-softening material and disposed between said posts, said tank having upper and lower end openings, means providing a gasket-sealed detachable connection between the lower end of the tank and said base and around the lower end opening of the tank and said upwardly facing base opening, a hollow member having a detachable gasket-sealed connection with the upper end of said tank extending around the upper end opening of the tank, a conduit communicating with said member and mounted on said other post for swinging movement to permit raising and lowering of said member to break said upper gasket-sealed connection, a crossbar rigidly connecting said posts and disposed above said tank, and means on said crossbar operable to apply downward pressure to said member for sealing said connections.

5. A water softener having, in combination, means providing hard water inlet and soft water outlet conduits, a base providing a horizontally extending water passage terminating in an upwardly facing flanged opening, spaced posts upstanding from said base, one being hollow and communicating at one end with the other end of said passage and at the other end with one of said conduits, a tank having end openings one telescoping with said flanged base operating to provide a detachable gasket-sealed connection around the latter, a hollow member engageable with the upper end of said tank and having a detachable gasket-sealed connection around the opening therein, means providing a water passage between the other of said conduits and said member, an element disposed above said tank and secured to said posts, and manually operable means for separating said element and said member to apply endwise pressure to said tank to clamp the same between said base and said member.

6. A water softener having, in combination, a base, a frame including spaced posts upstanding from said base, one being hollow, a tank detachably mounted at one end on said base and having end openings, inlet and outlet conduits on said frame, means providing water passages between said inlet and outlet and the respective tank openings, one passage extending through said hollow post and the other passage including a member having a detachable gasket-sealed connection with one of said tank openings, and means mounted on said post and manually operable to move said member toward and away from said tank to seal or release said connection.

7. A water softener having, in combination, two similar tanks arranged one above the other in end to end relation and each having projecting fittings at their ends defining alined upper and lower openings, a frame supporting said tanks and engaging the fittings that define the upper opening of the upper tank and the lower opening of the lower tank, said frame providing water passages respectively communicating with said two last mentioned openings, one constituting a hard water inlet and the other a soft water outlet, and a member telescoping with the fittings at the lower end of the upper tank and the upper end of the lower tank and providing detachable gasket-sealed connections with the respective fittings of the two tanks, said member providing a water passage between the tanks and engaging said frame to hold the adjacent ends of the two tanks against lateral displacement.

8. A water softener having, in combination, two similar tanks arranged one above the other in end to end relation and each having reduced ends defining openings, a frame engageable with the upper end of the upper tank and the lower end of the lower tank to support the tanks and hold such ends against lateral displacement, means providing gasket-sealed hard water inlet and soft water outlet connections around the upper end opening of the upper tank and the lower end opening of the lower tank, a member having a water passage therethrough and telescoping with the upper end of the lower tank and the lower end of the upper tank, said member having abutments engageable with such tank ends to form releasable gasket-sealed connections around the openings in the connected tank ends, and means engaging said connected tank ends and releasably holding the two against lateral displacement whereby to prevent relative tilting of the two tanks when connected by said member.

9. A water softener having, in combination, two similar tanks arranged one above the other in end to end relation and having fittings of the same size and shape at opposite ends defining alined tank openings, a supporting frame having gasket-sealed connections with the fittings at the lower end of the lower tank and the upper end of the upper tank and holding the engaged tank ends against lateral displacement with the fittings of the other ends of the two tanks disposed adjacent each other in opposed alined relation, said frame providing water passages communicating with the first mentioned tank ends, one constituting a hard water inlet and the other a soft water outlet, a member detachable from each of said tanks and having a water passage therethrough, oppositely facing gasket abutments around the ends of said last mentioned passage engageable with the fittings on said adjacent tank fittings to provide gasket-sealed connections with the two tanks when the latter are pressed together in an endwise direction, said member being movable relative to said frame to permit removal of the lower tank therefrom, and means on said member telescoping with the adjacent fittings on the respective tanks to aline these fittings with said abutments.

GLENN S. RALSTON.